C. A. GREENLEAF.
Turn-Table.

No. 226,996.  Patented April 27, 1880.

Attest.  Inventor.
E. R. Hill.  Clements A. Greenleaf,
Jno. W. Stickley  per Wm. Hubbell Fisher,
  Atty

UNITED STATES PATENT OFFICE.

CLEMENTS A. GREENLEAF, OF INDIANAPOLIS, INDIANA.

TURN-TABLE.

SPECIFICATION forming part of Letters Patent No. 226,996, dated April 27, 1880.

Application filed September 26, 1879.

*To all whom it may concern:*

Be it known that I, CLEMENTS A. GREENLEAF, of the city of Indianapolis, county of Marion, and State of Indiana, have invented certain new and useful Improvements in Turn-Tables, of which the following is a specification.

My improvements relate to the devices employed at the center of the turn-table as a support for the same and as a means whereby the turn-table can be rotated; and they consist in the combination of a supporting-column in whose upper end conical rollers roll with a rotating block surmounted by a cap, the latter being connected, either immediately or by intermediate devices, with the side beams of the table, and so shaped as to form, in connection with the rotating block, a universal joint.

The advantages of my invention are, first, the point upon which the table oscillates is higher, thereby lowering the center of gravity and enabling the table to be more readily kept in balance when the locomotive is upon it; second, the bed upon which the conical rollers roll is stationary and retains the axes of the rollers in a horizontal position, and the wear and friction upon the rollers are equal and constant, thereby avoiding the disadvantages consequent upon a device where the bed of the rollers moves, tips up and down with the table, and thereby creates an unequal friction between the ends of the rollers and the edges of the channels in which they roll; third, my invention enables me to place the rollers within the circumference of the upper end of the supporting-column, and by thus directly supporting them I am enabled to make the supporting-block shorter and lighter and also render the supporting-column lighter, thus economizing metal and at the same time retaining all the advantages derived from the use of the said block, &c.

Figure 1:
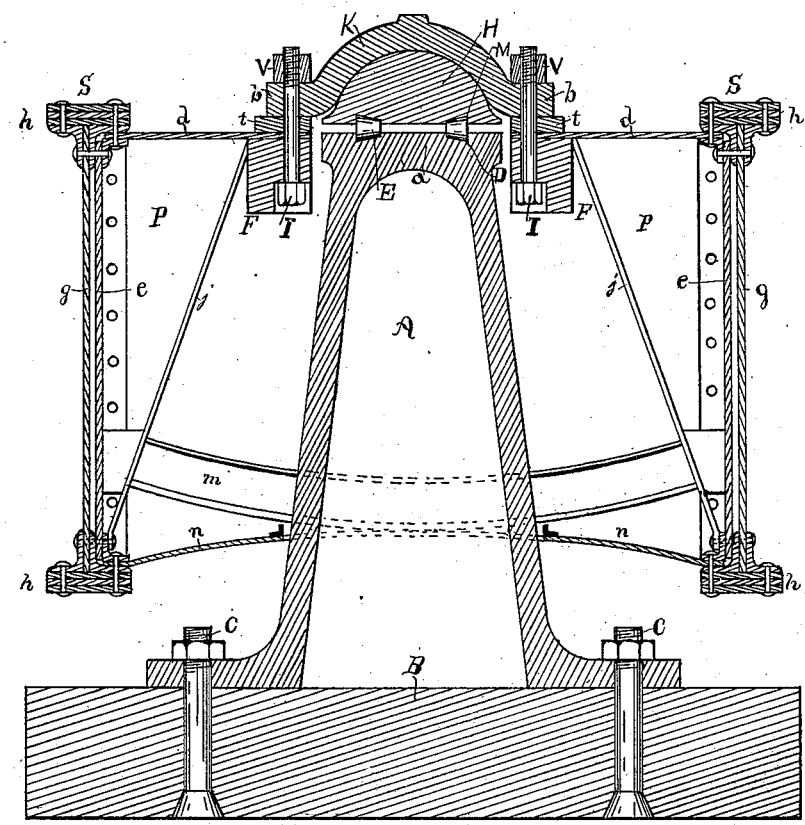
Figure 2:
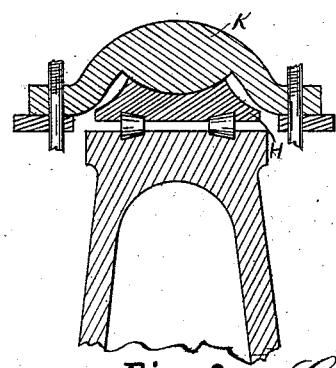

In the accompanying drawings, making part of this specification, Figure 1 is a vertical transverse section of a turn-table embodying my invention, said section being taken through the center of the supporting-column. Fig. 2 is a modification of the invention shown in Fig. 1.

A represents the central supporting-column, resting upon a suitable bed, (usually of stone,) as B, and suitably connected thereto, usually by bolts C bedded in the stone and passing up through the laterally extending base-flange of the column, and each provided at their upper end with a screw-thread, which engages a nut screwed down so as to securely hold the column to the bed. This column is preferably hollow, and its top $a$ is flat and provided with a circular channel, D, for the reception of a number of conical rollers, E, which roll in said channel. The bottom of said channel is inclined or beveled away outwardly, as shown, so as to allow the axes of the conical rollers to be horizontal.

The block H has a flat bottom, which is provided with a channel, M, and the bottom of the latter is inclined upward from within outwardly to allow the bottom of the channel to rest equally everywhere upon the upper surface of each roller. The upper suface of said block H is rounded, and approximates in shape to a hemisphere. The block is of such preferably small diameter as that vertical lines passing through the outer edge of the block fall within the circumference of the top of column A.

The central portion of the lower side of the cap K is hollow, as shown, and shaped to fit the curved convexity of the upper side of block H. The cap K is further provided with laterally-projecting flange $b$. This latter is connected to a box or devices of the usual or of any desired conformation, and these, in turn, to the side beams of the usual or any desired construction. Here the flange is secured to a box, P, having an upper plate, $d$, and provided at each side with a plate, $e$, securely bolted to a web, $g$, of a beam, S, which latter has an upper and a lower flange, $h$.

The box is braced by oblique braces $j$ and transverse curved braces $m$, the latter attached to the bottom plate, $n$, of the box, this bottom plate being provided with a suitable orifice, through which passes the supporting-column A.

Between cap K and plate $d$ are washers $t$, and below plate $d$ an annular ring, F, provided at bottom with an annular interior recess for the heads of bolts I, which bolts pass through the ring F and through the washers $t$ and through the flange $b$ of cap K. A nut, V, engages a screw-thread on the upward-projecting end of each bolt, and on being screwed down tightly secures the cap K to the box P.

A modification of my invention is shown in Fig. 2, and consists in reversing the convexity and concavity of the adjacent surfaces of block H and cap K, so that the under surface of cap K is of a partly spherical conformation and the upper surface of block H of a curved concave shape adapted to closely fit the spherical surface of cap K.

The mode in which my invention operates is as follows: Any vertical play of the ends of the turn-table does not strain the supporting-column, as the cap K accommodates such play by moving upon the block H. The table is easily turned, the block H revolving upon the conical rollers E, the latter rolling in channel D of column A. The edges of channel M prevent block H from slipping off the rollers E.

What I claim as new and of my invention, and desire to secure by Letters Patent, is—

1. In a turn-table, the combination of column A, provided with groove D, rollers E, block H, provided at under side with groove M and convexly curved above, and cap K, concavely curved to fit the upper side of block H, substantially as and for the purposes specified.

2. The combination of column A, provided with groove D, and block H, provided with groove M, rollers E in said grooves D and M, and cap K, and block H, constructed as a universal joint, substantially as and for the purposes specified.

CLEMENTS A. GREENLEAF.

Attest:
E. H. FOSTER,
JNO. W. STREHLI.